No. 756,236. PATENTED APR. 5, 1904.
A. S. HORLACHER.
ART OF MANUFACTURING WEFT FOR RUGS.
APPLICATION FILED MAY 6, 1903.
NO MODEL.
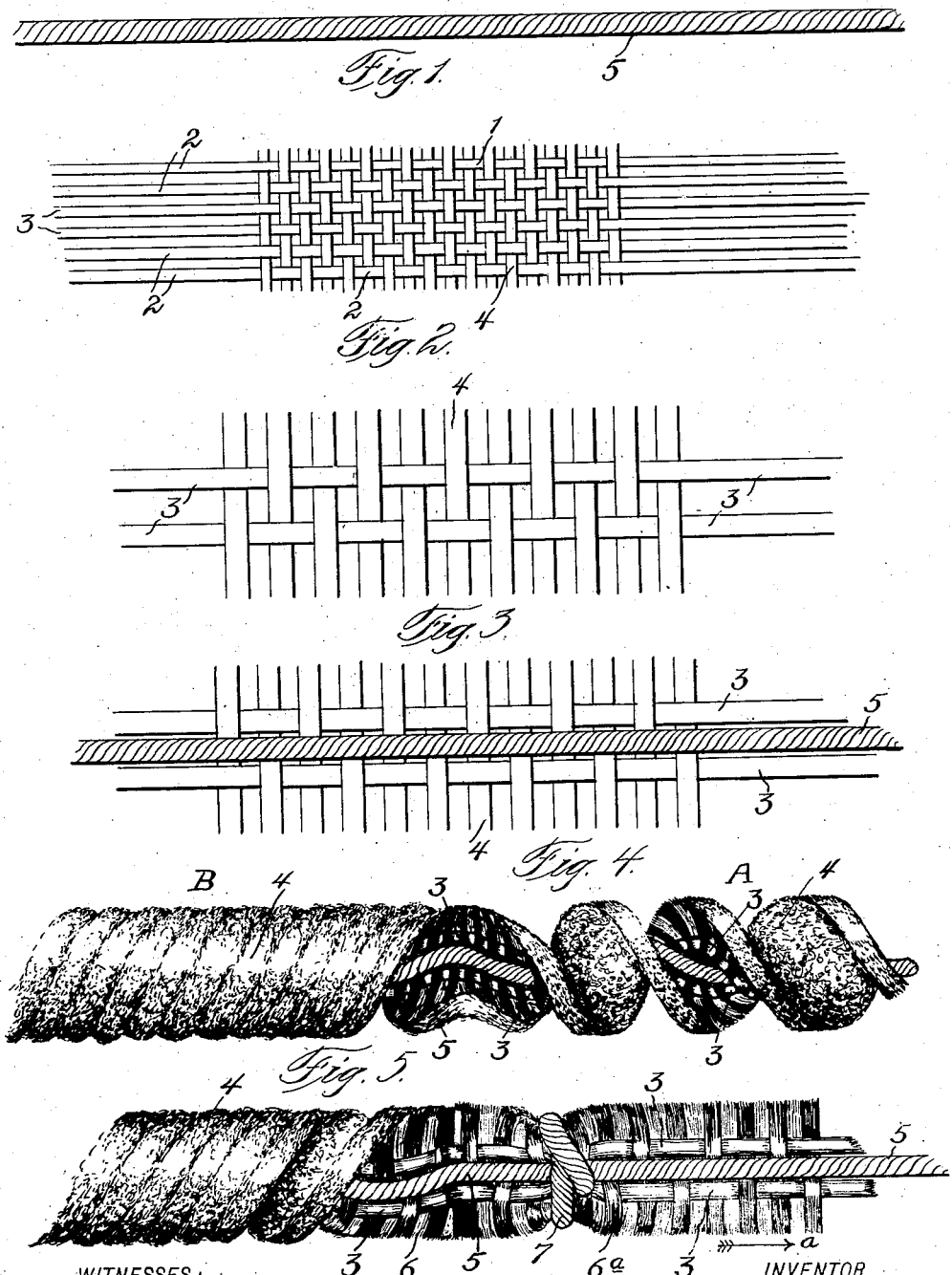
WITNESSES: INVENTOR
Adam S. Horlacher
BY
Thompson &c.
ATTORNEY No. 756,236. Patented April 5, 1904.

UNITED STATES PATENT OFFICE.

ADAM S. HORLACHER, OF INDIANAPOLIS, INDIANA.

ART OF MANUFACTURING WEFT FOR RUGS.

SPECIFICATION forming part of Letters Patent No. 756,236, dated April 5, 1904.

Application filed May 6, 1903. Serial No. 155,852. (No specimens.)

*To all whom it may concern:*

Be it known that I, ADAM S. HORLACHER, a citizen of the United States, residing at Indianapolis, in the county of Marion and State of Indiana, have invented new and useful Improvements in the Art of Manufacturing Weft for Rugs, of which the following is a specification.

My invention relates to new and useful improvements in the art of manufacturing weft from and out of worn-out carpet or cuttings of carpet, to be used as a material to be woven into rugs, and will be hereinafter set forth, and particularly pointed out in the claims.
The art of manufacturing weft for rugs from worn-out or old carpets is of comparatively recent origin, and the difficulty experienced in manufacturing rugs from said old material consisted, and it still exists, chiefly in the application and the use of such rotten worn-out material as a filling or weft, which filling or weft usually consisted of strips cut from said material, and the handling of such required great care in order to prevent frequent breaks.
Old carpet or any carpet intended to be used as a filler was first cut into strips of the required width and said strips were raveled at their edges in such a way as to remove the warp therefrom and retain a portion of the strings or warps in the center of the strip, which warps bound and held the original filling of the carpet together. This operation having been completed, the material thus prepared was ready for the loom. The weaver being supplied with the strips thus prepared applied the same by hand to and between the warp in the loom, and when said prepared material was thus manually placed in position between the warps the loom was manually operated to weave said strips in the usual way, after which operation he proceeded in a similar way to again apply the said filler in the same way, and thus the process was continued until the rug or carpet was completed. It is obvious that this state of the art was crude, tedious, and slow; crude, because the product thus woven was rough, hard, and unsightly; tedious, because the rotten strips of carpet had to be placed by hand during the process of hand-weaving between the warps and spliced together or lapped at their ends; slow, because long time was required to select the material and place it in position, which placing in position required great care in handling in order that the rotten material be not broken into short pieces, necessitating an undue amount of splicing or lapping of the ends of the broken pieces, thereby creating uneven places or lumps on the surface of the rug, and thus the operator was obliged alternately to place the weft or filling in and between the warp and operate the batten or lay of the loom, which alternate operations consumed time. Slight improvements had been introduced over the above process, consisting of a series of operations—first, raveling the strips of carpet on their edges, as previously described, then piecing the raveled strips at their ends by stitching them together to form a continuous or a very long strip. The long strip thus made was wound upon a suitable shuttle, which was operated by hand. This, while a slight improvement on the old process, did not eliminate the defects thereof entirely, the main defect being the difficulty in handling the weft, which invariably would break and required repiecing. Now in order to improve the nature of the product, facilitate the manufacture of the same, and reduce the cost of its production to a minimum other new and improved means and methods must of necessity be employed and which improved method and means constitutes my invention, which I will now describe.

First, the main object of this invention is to provide a filler or weft made from worn-out carpet, with a strengthening means whereby the filler or weft may be used in connection with a fly-shuttle; second, to provide a means whereby the reinforcing string or bond will be applied to and so twisted with the carpet-strips, that have been previously raveled as described, that said reinforcing string or bond will be completely concealed and form a part of the filler or weft; third, to provide a means whereby the ends of the strips may be spliced or connected by looping said core around said ends of the pieces to be connected to bind or splice them together, which operation is performed during the process of twisting.

Another object of this invention is to manufacture a weft or filling for rugs or other analogous material, so that when woven into a fabric both surfaces will be alike, and consequently reversible; and a still further object is to construct such weft that when woven into a fabric the warp of said fabric will be completely concealed and embedded in the filling, and therefore protected from wear.

I attain these objects by means of the filling constructed in the manner described in the specification and illustrated in the accompanying drawings, in which similar characters of reference designate like parts.

Figure 1 represents a thread or string which may be of any required degree of coarseness or strength and which is used as a bond or bracing-piece for the raveled strips of carpet constituting the filler or weft. Fig. 2 is a view of a strip cut from any refuse carpet and showing the warp and the filler or weft thereof. Fig. 3 is a view of said strip after having undergone the raveling process and showing the raveled edges thereof. Fig. 4 shows the raveled strip and bond or binder applied to said strip to extend longitudinally thereof and showing said filler before the operation of twisting said strip and binder together. Fig. 5 is a view showing the strip and binder twisted together, one half of which is tightly twisted and the other loosely twisted and exposing the core to view; and Fig. 6 is a view showing the manner of splicing the ends of the strips together to form an unbroken strip of any required length.

Any refuse carpet, carpet-cuttings, or worn-out carpet is cut into strips 1 of suitable width and raveled at their edges to remove the outer warp-threads 2 and retain at least two warp-threads 3 to extend longitudinally of the strips to form a binder to retain the original filler 4 intact. The binder 5 may be of any suitable yarn or thread material and is applied to the raveled strip 1, as shown particularly in Fig. 4, and said strip 1 and binder 5 are twisted together by any suitable means to unite and combine the two together, as shown particularly in Fig. 5, one half, A, of which is shown slightly and loosely twisted to expose the binder 5 to view, and the other half, B, is twisted tightly to show the manner by which the binder is concealed and completely encircled by the raveled strips 1. Now since the strips constituting the filling are of variable lengths, the lengths depending on the condition of the carpet used and the manner in which said carpet is cut up, the said strips must be united or spliced at their ends, and as the older method, previously described, is a slow, tedious, and expensive operation I employ therefor a new means of splicing and binding the ends of said strips together, which operation is performed concurrently or nearly so with the operation of twisting the binder 5 and the raveled strip 1 together and which process constitutes another very important feature of my invention, which I will now proceed to describe.

The binder 5 and strip 1, having been twisted together to an extent almost to the end of said strip 1, (see Fig. 6,) said binder 5 is looped at the point of juncture of said end 6 and 6ª in such a manner that the loop 7 thus formed encircles the end 6 of said strip 1, and the end 6ª of the next adjacent strip to be connected is placed within said loop 7 so that its end 6ª laps over the end 6 of said strip 1 and the binder 5 is drawn tightly in the direction of the arrow $a$ to cause said loop 7 to contract to tightly hold said ends 6 and 6ª together to form a strong splice, after which operation of splicing the twisting process is continued, and thus the twisting and the splicing of other pieces or strips is continued until the required length of filling or weft is made. It is obvious that weft or filling thus prepared and made is strong and durable and sufficiently strong to stand the stress of being worked in a fly-shuttle to be woven into a fabric.

Having thus fully described this my invention, what I claim as new and useful, and desire to secure by Letters Patent of the United States therefor, is—

1. The improvement in the art of manufacturing weft for rugs or other analogous fabric, which consists in first cutting a carpet into strips of suitable width, raveling the edges of the same to leave the original warp in the center of the strip for a binder or bond, and then finally twisting such strip to cause the projecting edges to radiate from the center.

2. The improvement in the art of manufacturing weft for rugs or other analogous fabric, which consists in first cutting a carpet into strips of the required width, then raveling the edges of said strips and applying a string or binder to said strip to extend longitudinally thereof, and finally twisting said strip and binder together to form a single piece.

3. The improvement in the art of manufacturing weft for rugs or other analogous fabric, which consists in first cutting a carpet into strips then applying a string or binder to said strip to extend longitudinally thereof, lapping or splicing the ends of said carpet-strips and twisting the said binder and splices thus formed to form a continuous piece.

In testimony whereof I have hereunto set my hand in the presence of two subscribing witnesses.

ADAM S. HORLACHER.

Witnesses:
THOMPSON R. BELL,
NINA WINTERBERG.